US011014540B2

(12) United States Patent
Butz et al.

(10) Patent No.: US 11,014,540 B2
(45) Date of Patent: May 25, 2021

(54) DEVICE AND METHOD FOR CLEANING AND PRECISION MACHINING OF WORKPIECES

(71) Applicant: PFLUEGER PRAEZISION GMBH, Enzweihingen (DE)

(72) Inventors: Peter Butz, Eberdingen (DE); Michael Pytkowjat, Ingersheim (DE)

(73) Assignee: Pflueger Praezision GmbH, Enzweihingen (DE)

( * ) Notice: Subject to any disclaimer, the term of this patent is extended or adjusted under 35 U.S.C. 154(b) by 231 days.

(21) Appl. No.: 16/008,512

(22) Filed: Jun. 14, 2018

(65) Prior Publication Data

US 2018/0290633 A1    Oct. 11, 2018

Related U.S. Application Data

(63) Continuation of application No. PCT/EP2016/080648, filed on Dec. 12, 2016.

(30) Foreign Application Priority Data

Dec. 21, 2015  (DE) .......................... 10 2015 122 388

(51) Int. Cl.
*B60S 3/06* (2006.01)
*B08B 1/04* (2006.01)
(Continued)

(52) U.S. Cl.
CPC .............. *B60S 3/06* (2013.01); *A46B 13/001* (2013.01); *A46B 13/003* (2013.01); *A46B 13/02* (2013.01);
(Continued)

(58) Field of Classification Search
CPC ... B08B 6/00; B08B 7/04; B08B 15/04; B60S 3/06; B60S 3/063; B60S 3/066;
(Continued)

(56) References Cited

U.S. PATENT DOCUMENTS 3,601,832 A     8/1971   Cook
5,056,267 A *  10/1991   Nicely .................... B24B 19/26
                                                            15/53.1
(Continued)

FOREIGN PATENT DOCUMENTS

CA        1330851 C    7/1994
EP        0381904 A1   8/1990
(Continued)

OTHER PUBLICATIONS

International Search Report for PCT/EP2016/080648; dated Feb. 23, 2017; 3 pp.

(Continued)

*Primary Examiner* — Mark Spisich
(74) *Attorney, Agent, or Firm* — Harness, Dickey & Pierce, P.L.C.

(57) ABSTRACT

A device for cleaning or precision machining of workpieces comprises a housing; a central roller having two ends supported by means of rotary bearings on carriers fixed on the housing; a first roller having a first end connected to one of the carriers by a joint and having a second end supported by means of a rotary bearing; a second roller having a first end connected to another one of the carriers by a joint and having a second end supported by means of a rotary bearing; a drive motor for rotatingly driving the first and second rollers and the central roller for treating a workpiece; a suction device for removing particles from the rollers; and at least a first and a second pinion gear coupled to the first and second rollers for angularly adjusting the first and second rollers with respect to said central roller.

19 Claims, 5 Drawing Sheets

(51) Int. Cl.
| | |
|---|---|
| *B08B 15/04* | (2006.01) |
| *B08B 6/00* | (2006.01) |
| *B08B 7/04* | (2006.01) |
| *B08B 1/00* | (2006.01) |
| *A46B 13/02* | (2006.01) |
| *A46B 13/00* | (2006.01) |
| *B24B 55/06* | (2006.01) |
| *B60S 3/04* | (2006.01) |
| *B08B 1/02* | (2006.01) |
| *B24B 27/033* | (2006.01) |
| *B24B 19/26* | (2006.01) |

(52) U.S. Cl.
CPC .............. *B08B 1/002* (2013.01); *B08B 1/007* (2013.01); *B08B 1/04* (2013.01); *B08B 6/00* (2013.01); *B08B 7/04* (2013.01); *B08B 15/04* (2013.01); *B24B 55/06* (2013.01); *B60S 3/048* (2013.01); *B60S 3/063* (2013.01); *A46B 2200/3046* (2013.01); *B08B 1/02* (2013.01); *B24B 19/26* (2013.01); *B24B 27/033* (2013.01)

(58) Field of Classification Search
CPC ..... A46B 13/00; A46B 13/001; A46B 13/003; A46B 13/02; A46B 2200/3046; B24B 5/36; B24B 19/009; B24B 19/26; B24B 27/033; B24B 55/06
USPC ... 15/1.51, 21.1, 53.1, 53.2, 88.3, 88.4, 97.3
See application file for complete search history.

(56) References Cited

U.S. PATENT DOCUMENTS

| | | | |
|---|---|---|---|
| 5,115,531 A * | 5/1992 | Suzuki | B64F 5/30 15/53.2 |
| 5,405,450 A * | 4/1995 | Mifsud | A46B 13/001 134/1 |
| 2003/0145418 A1 | 8/2003 | Ikeda et al. | |
| 2007/0124878 A1 | 6/2007 | Rodrigues et al. | |

FOREIGN PATENT DOCUMENTS

| | | |
|---|---|---|
| EP | 0808753 A1 | 11/1997 |
| FR | 2635024 A1 | 2/1990 |
| FR | 2882290 A1 | 8/2006 |
| JP | S55016971 Y2 | 4/1980 |
| JP | S61033686 U | 2/1986 |
| JP | H01160761 A | 6/1989 |
| JP | 2003040089 A | 2/2003 |
| JP | 2006525914 A | 11/2006 |
| JP | 2009241291 A | 10/2009 |
| JP | 2013193034 A | 9/2013 |
| KR | 20130025530 A | 3/2013 |
| KR | 101560618 B1 | 10/2015 |
| WO | WO-2010089143 A1 | 8/2010 |

OTHER PUBLICATIONS

English translation of International Preliminary Report on Patentability (Chapter I); dated Jun. 26, 2018; 11 pp.

* cited by examiner

DEVICE AND METHOD FOR CLEANING AND PRECISION MACHINING OF WORKPIECES

CROSS-REFERENCES TO RELATED APPLICATIONS

This application is a continuation of international patent application PCT/EP2016/080648, filed on Dec. 12, 2016, designating the U.S., which international patent application has been published in German language and claims priority from German patent application 10 2015 122 388.0, filed on Dec. 21, 2015. The entire contents of these priority applications are incorporated herein by reference.

BACKGROUND OF THE INVENTION

The invention relates to a device and a method for cleaning or precision machining of workpieces, in particular also to the cleaning of car bodies or rotor blades for wind wheels, before a coating step, in particular a painting step.

Vehicle bodies, also called body shells, nowadays usually are painted on fully automatic assembly lines. To this end initially immersion prime coating is applied onto the body shell, thereafter a filler is applied, and finally the painting is applied. Within the prior art the body shells before painting are guided through large volume tin cabins (with passenger body shells about 12 m×5 m×5 m). Within these cabins there are rollers with emu feathers along which the body runs and is roughly cleaned thereby. In addition a strong suction rate is applied (about 30,000 m³/h).

Such a device requires a large space, in addition due to the large suction volume a high energy consumption results. Finally the respective cleaning not always is regarded as being sufficient. In addition an adaptation to different car body shapes is only partially possible or requires respective adaptation work.

SUMMARY OF THE INVENTION

In view of this it is an object of the invention to disclose a device for the for the cleaning of workpieces that in particular is suitable for cleaning of car bodies or other parts, such as rotor blades for wind wheels before a painting. Herein in particular a larger flexibility shall be made possible when compared to prior art devices.

According to one aspect of the invention this object is achieved by a device for cleaning or precision machining of workpieces, comprising:
  a housing;
  a first wing and a second wing received adjustably within said housing;
  a first pinion gear received within said housing engaging said first wing allowing to adjust said first wing;
  a second pinion gear received within said housing engaging said second wing allowing to adjust said second wing;
  a central roller having first and second ends being supported by means of rotary bearings on carriers fixed on said housing;
  a first roller having a first end being connected to said first end of said central roller by a joint and having a second end being supported on said first wing by means of a rotary bearing;
  a second roller having a first end being connected to said second end of said central roller by a joint and having a second end being supported on said second wing by means of a rotary bearing;
  a drive motor for rotatingly driving said first and second rollers and said central roller for treating a workpiece; and
  a suction device for removing particles from said rollers;
  wherein said first and second pinion gears are configured for angularly adjusting said first and second rollers with respect to said central roller by adjusting said wings.

According to another aspect of the invention there is disclosed a method of cleaning workpieces, in particular of cleaning body parts for a subsequent coating treatment, wherein a handling device is provided having an arm that is movable with respect to a workpiece, whereon a device is provided having a housing, wherein at least one rotating roller is received, wherein the device with its rotating roller moves along the workpiece surface for cleaning, wherein simultaneously air is aspirated within the region of the workpiece surface.

The object of the invention is fully solved in this way.

According to the invention now a device is provided that can be directly connected with a handling device, such as a robot or a portal, and that by means of the handling device can be specifically guided along the workpiece surface for cleaning. By the simultaneous suction of air by means of the suction device herein a very effective cleaning is ensured.

At each roller a brush is received. Depending on the structure of the brush the device may be used for different cleaning works, such as for cleaning, in particular dust removal from workpieces before a subsequent painting, but also for polishing, grinding or activating of workpieces.

Preferably each roller comprises a central roller body, at the outer circumference of which preferably a brush consisting of plastic is secured. The roller body preferably consists of plastic.

In this way the roller body can be used for suspending and for driving the roller, while a brush can be removably secured thereto.

In one embodiment, for the cleaning of car bodies or of similar workpieces prior to a subsequent painting treatment, the filaments of the brushes may consist for instance of plastic, such as polyamide PA 6.12 with a thickness of 0.2 mm.

Any kind of different brushes are also conceivable for other applications.

In another development of the invention there is assigned a ionization device to each roller.

In this way dust particles can be neutralized so that they do not adhere to the surface to be cleaned and can be sucked off.

According to a further configuration of the invention at least two, preferably three rollers are provided that each comprise a cover and that are coupled to a suction device and that can be adjusted relative to each other, in particular can be angularly adjusted with respect to each other.

By using several rollers that can be adjusted with respect to each other a particularly good adaptation to the working surface of different workpiece surfaces is ensured.

According to a further configuration of the invention the rollers are located side by side axially aligned with respect to each other and can be adjusted continuously with respect to each other by means of at least one setting drive.

In this way a particularly advantageous adaptation to different workpiece contours is made possible.

Preferably herein the rollers can be adjusted with respect to each other in a particular range convexly and/or concavely to the outside.

In this way an adaptation to different workpiece contours can be made possible.

According to a further configuration of the invention the rollers are driven by a common drive.

This allows for a reliable and cost-effective design.

According to a further configuration of the invention to this end one of the rollers at the outer end thereof is coupled with the drive by means of an axial drive socket and is coupled with the other rollers by means of joints, in particular universal joints, for driving the latter.

In this way a common drive for several rollers can be realized in a particularly simple way.

In an additional development of the invention herein the central roller at the two ends thereof is mounted by means of rotary bearings on carriers, wherein at each side of the central roller an additional roller is coupled by means of a central joint, in particular a universal joint, and wherein the outer rollers at the outer ends thereof are each held on wings that at the other ends thereof can each be adjusted by means of a pinion drive.

In this way an angular adjustment of the rollers with respect to each other can be realized in a simple way. The joints between the central roller and the outer rollers in this way are used for supporting the outer rollers.

In an additional development of this design the drive for the outer roller comprises a drive motor that is received on one of the wings and that is coupled with the roller, preferably by means of an intermediate shaft and assigned coupling means.

In this way the drive can be moved commonly with one of the two wings and at the same time can be used for driving the rollers coupled thereto.

Each roller preferably comprises a central roller body that preferably consists of plastic, and whereon the bearing for the roller and the rotary drive for the roller is provided.

In a further configuration of the invention each pinion drive comprises a bent rack that is driven by a pinion.

In this way a continuous adjustment of the outer rollers with respect to the central roller can be reached.

Herein preferably the design is such that at each pinion drive the pinion is rotatable about an axis that extends through the radial plane of the central roller and that also includes the central joint of the assigned roller.

In this way a simple angular adjustment of the outer rollers with respect to the central roller is made possible, wherein simultaneously the respective joint connection can be used to rotatingly drive the individual rollers for supporting the rollers at these ends, while the support of the outer rollers is reached at the end of the assigned wing, respectively.

According to a further configuration of the invention each pinion drive is coupled to a servomotor.

In this way the two outer rollers can be angularly adjusted independently from each other with respect to the central roller.

According to a further configuration of the invention each roller can be continuously adjusted with respect to the revolution speed thereof, preferably in a range of 0 to 400 1/min, more preferably of 0 to 300 1/min.

According to a further configuration of the invention the direction of rotation of the roller(s) can be reversed.

By these features a particularly good adaptation of the rollers to the respective treatment objective is made possible.

According to a further configuration of the invention to each brush there is assigned at least one doctor blade that rests against the brush for removing particles adherent thereto.

In this way adherent particles, in particular dust particles, are effectively removed from the brush.

In addition by the invention there is provided a system for cleaning or precision machining of workpieces, comprising a handling device, in particular a robot or a portal, whereon a device as described above is received.

Herein the device is preferably coupled to a movable arm of the handling device by means of a flange.

Further preferred the system comprises at least one controller for automatically controlling at least a movement of the handling device, or an angular position of the rollers with respect to each other, or of a revolution speed of the rollers, or of a direction of rotation of the rollers, or a voltage of an assigned ionization device.

In this way an automatic controlling is made possible that can also be integrated in higher ranking controlling of the complete system, or that can be coupled directly with the controller of the handling device.

In a development of the method of the invention the cleaning device is automatically guided along the workpiece surface and is adjusted to the contour of the workpiece surface by means of several rollers.

In this way an automatic treatment is made possible.

It will be understood that the afore-mentioned features of the invention and the features to be described hereinafter cannot only be used in the combination respectively given, but also in different combinations or independently, without leaving the scope of the present invention.

BRIEF DESCRIPTION OF THE DRAWINGS

Further features and advantages of the invention can be taken from the subsequent description of a preferred embodiment with respect to the drawings. In the drawings show.

DESCRIPTION OF PREFERRED EMBODIMENTS

Figure 1:
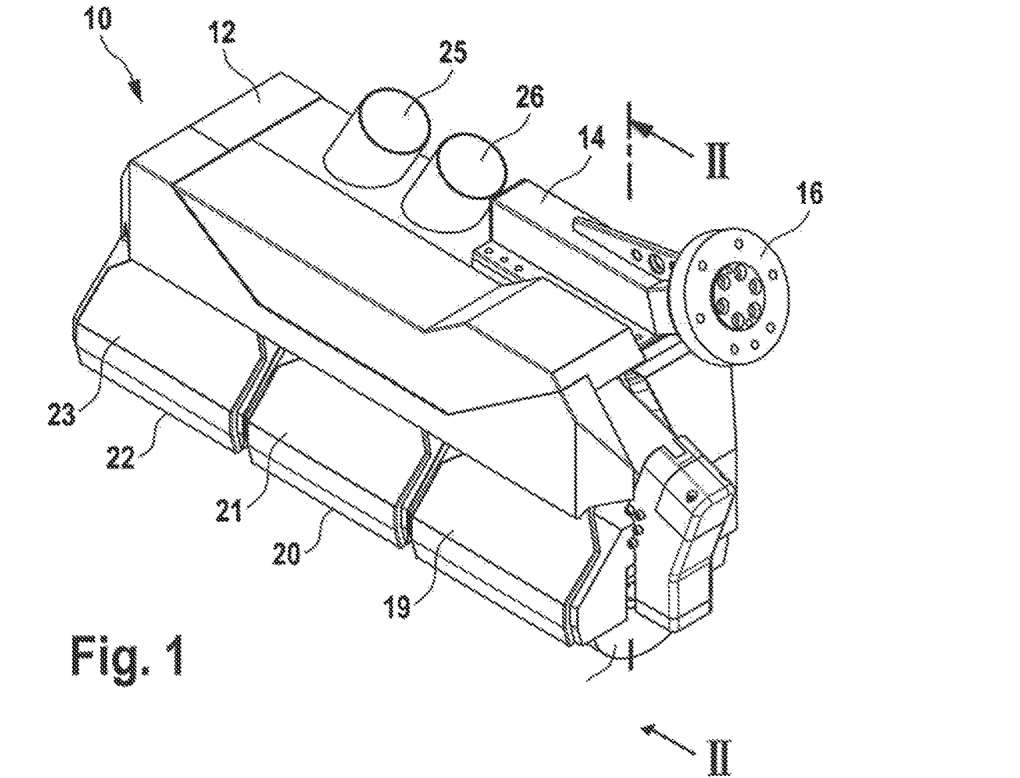
FIG. 1 is a perspective view of a device according to the invention.

In FIG. 1 a device according to the invention for cleaning or precision machining of workpieces is shown in a perspective representation and denoted in total with numeral 10.

The device 10 comprises a housing 12 which is received on a carrier 14, and the outer end of which a flange 16 for coupling to any kind of handling device is provided.

At the lower end of the housing 12 there are located three rollers 18, 20, 22 that at both sides are covered by a cover 19, 21, 23, so that (as can be seen from FIG. 3) at the roller 18, 20, 22 an exposed section is formed that serves for workpiece treatment, while a larger part of the roller 18, 20, 22 is fully covered by the assigned cover 19, 21, 23 and can thus be connected to a suction device.

According to FIG. 1 at the upper end of the housing there are located two connection fittings 25, 26 that by means of a suitable suction pipe can be coupled to a suction device (not shown). The connection fittings 25, 26 within a hollow space within the housing 12 are connected with the hollow spaces that are formed at each roller 18, 20, 22 by the covers 19, 21, 23. In this way an effective suction can be ensured at each roller 18, 20, 22.

Figure 2:
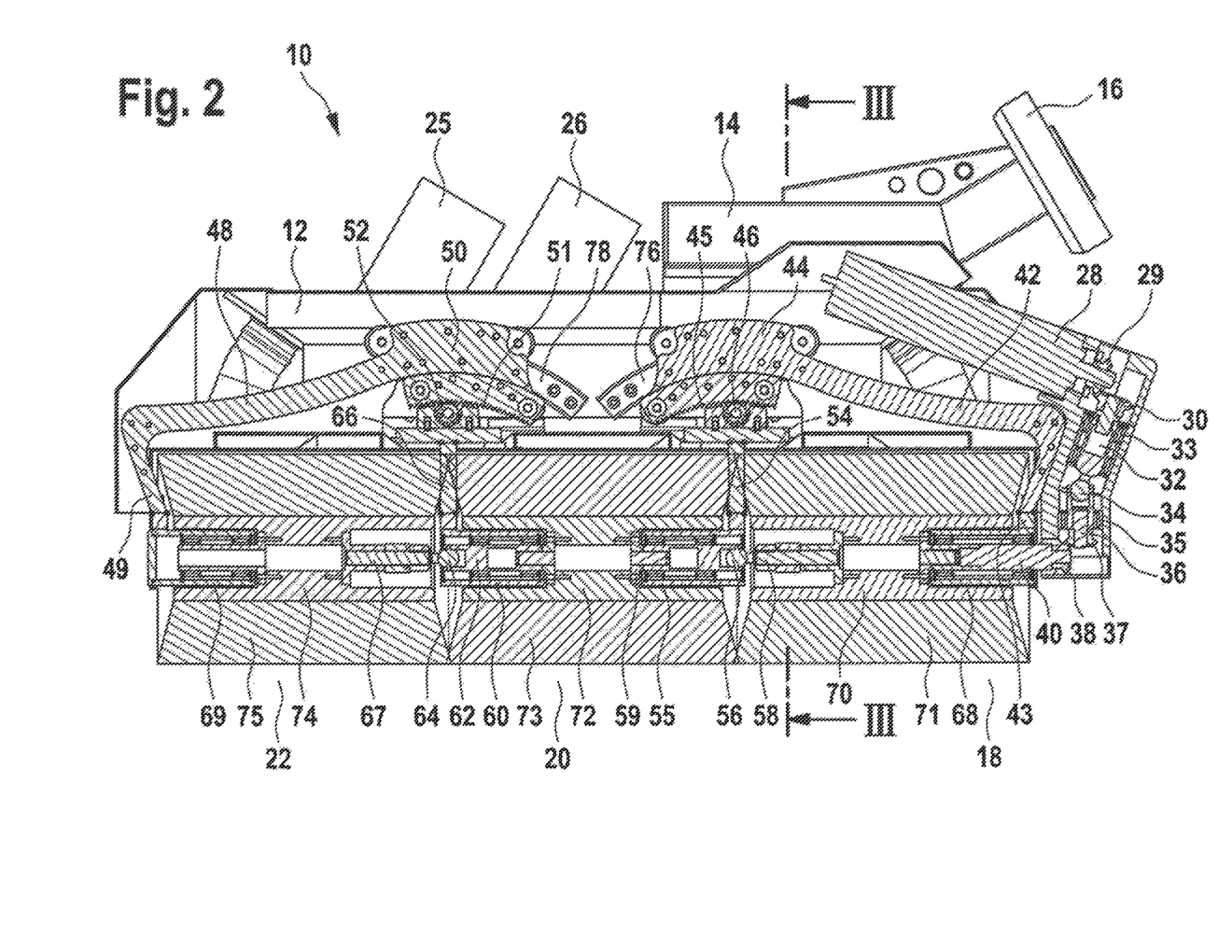
FIG. 2 is a longitudinal section through the device according to FIG. 1, wherein the section or plane is depicted by II-II.

According to FIG. 2 each roller 18, 20, 22 consists of a central roller body 70, 72, 74 made of plastic, e.g. polyamide, having a cylindrical outer perimeter and a brush 71, 73, 75 received thereon. The individual bristles for instance consist of polyamide, in particular of polyamide PA 6.12 having a thickness of 0.2 mm.

Such a design is particularly suited for cleaning automobile bodies before painting.

The rollers 18, 20, 22 can be driven rotatingly about their longitudinal axes by means of a common drive within a range of revolution speed of 0 to 300 1/min.

The central roller 20 at its two axial ends is received rotatingly at the roller body 72 by means of a rotary bearing 55, 60 on carriers 54, 66.

The two outer rollers 18, 22 at a first end are connected rotatingly with the center roller each by means of a joint 56, 64, that is configured as a universal joint and also serves for rotary driving. At the outer ends the two outer rollers 18, 22 each are secured at a wing 42, 48 and can be pivoted by means of a pinion gear 45, 46 or 51, 52, respectively, at the other end of the wing 42, 48 continuously with respect to the central roller 22. The two wings 42, 48 have a substantially L-shaped form, wherein the short arm of the respective wing 42 or 48, respectively, protrudes around the axial end of the respective roller 18 or 22, respectively, and is connected therewith rotatingly by means of a rotary bearing 68 or 69, respectively.

For a common drive of the rollers 18, 20, 22 a drive motor 28 is secured to the first wing 42. The drive motor 28 by means of its motor shaft drives a bevel gear 29, 30, whereby an intermediate shaft 32 is driven. The intermediate shaft 32 is received rotatingly by means of a bearing 33 within a surrounding housing part and is coupled at its end by means of a joint 34 configured as a universal joint to another intermediate shaft 36. The latter is also received rotatingly by means of a bearing 35. The second intermediate shaft 36 finally by means of another bevel gear 37, 38 drives a drive fitting 40 at the roller body 70 of the first roller 18.

The roller body 70 at the other end is connected by means of a support 58 to the joint 56 which is configured as a universal joint and that is coupled by an assigned support 59 to the roller body 72 of the center (central?) roller 20. The roller body 72 at its other end is coupled to a further joint 64 being configured as a universal joint by means of a support 62. In this way the rotary motion of the roller body 72 is transferred onto the third roller 22 by means of the universal joint, for which again a support 67 at the third roller body 74 is coupled to the joint 64.

Thus all three roller bodies 70, 72, 74 can be driven rotatingly by means of a common drive motor 28.

The joints 56, 64 between the roller body 72 of the central roller 20 and within the two outer roller bodies 70, 74 of the outer rollers 18, 22 thus on the one hand serve for supporting the roller bodies 70, 74, and on the other hand for transferring a torque between adjacent roller bodies 70, 72, 74.

The wings 42, 48 by means of their respective pinion gear 45, 46 or 51, 52, respectively, can be adjusted such that from the axially aligned position of the rollers 18, 20, 22 shown in FIG. 2 a moving of the ends 44 or 50, respectively of the wings 42 or 48, respectively, is made possible by a certain amount to the inside and by a larger amount to the outside.

In this way on the one hand a pivoting of the rollers 18 or 22, respectively, about a certain amount to the inside is made possible, so that a convex arrangement of the rollers 18, 20, 22 results. On the other hand the ends 44 or 50, respectively, can be displaced to the outside by means of the pinions 46 or 52, respectively, so that the other ends 43 or 49, respectively of the wings 42 or 48, respectively, can move to the outside, so that a position according to FIG. 6 results that in total is designated with 10'. In this position a concave arrangement of the rollers 18, 20, 22 results.

Figure 3:
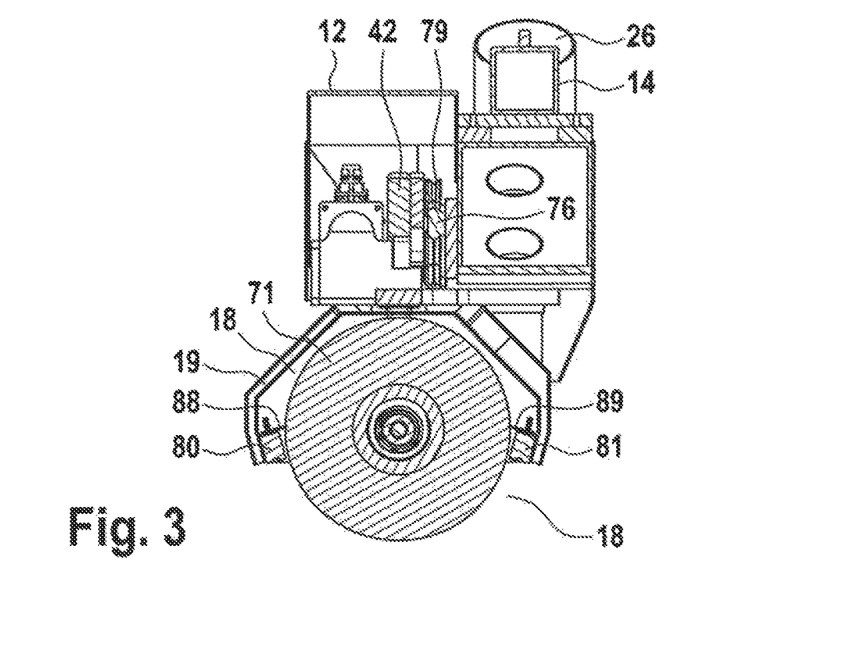
FIG. 3 is a section through the device of FIG. 2 along the line III-III.

The wings 42, 48 according to FIG. 3 at their back sides are provided with guide rollers 79 that rest against assigned guide rails 76 for guiding the wings 42, 48 along their main direction of extension.

Figure 6:
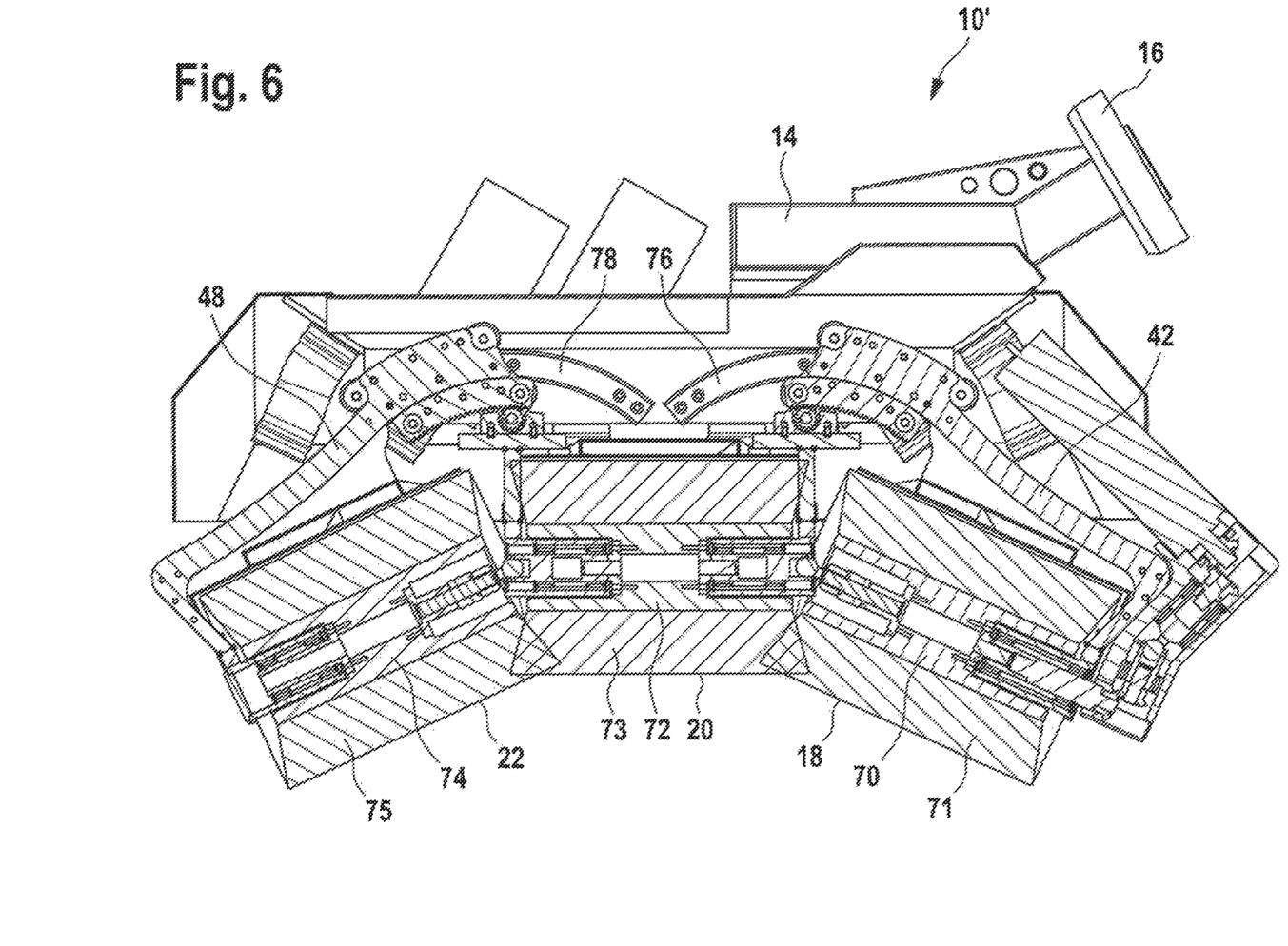
FIG. 6 is the device according to FIG. 2, however in a different position, wherein the outer rollers have been pivoted to the outside with respect to the central roller.

The respective guides 76, 78 can be seen in FIG. 2 and in FIG. 6.

Figure 4:
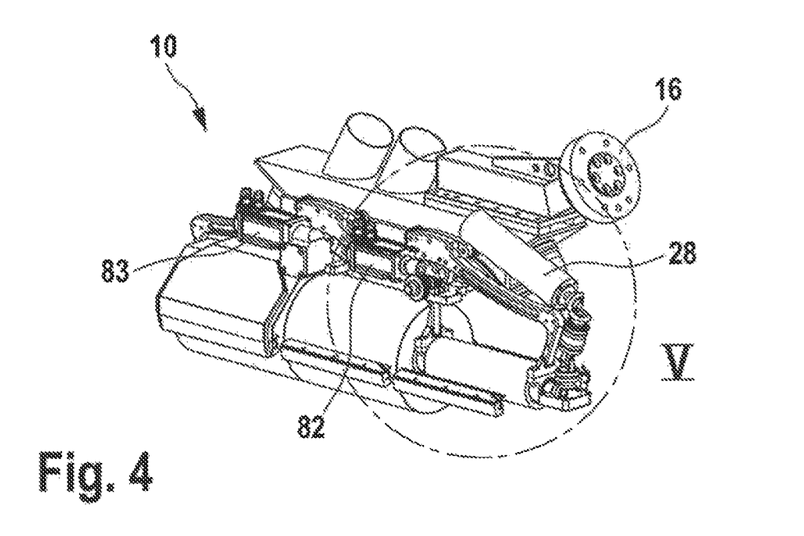
FIG. 4 is a perspective view of the device according to FIG. 1, wherein the housing is partially removed.
Figure 5:
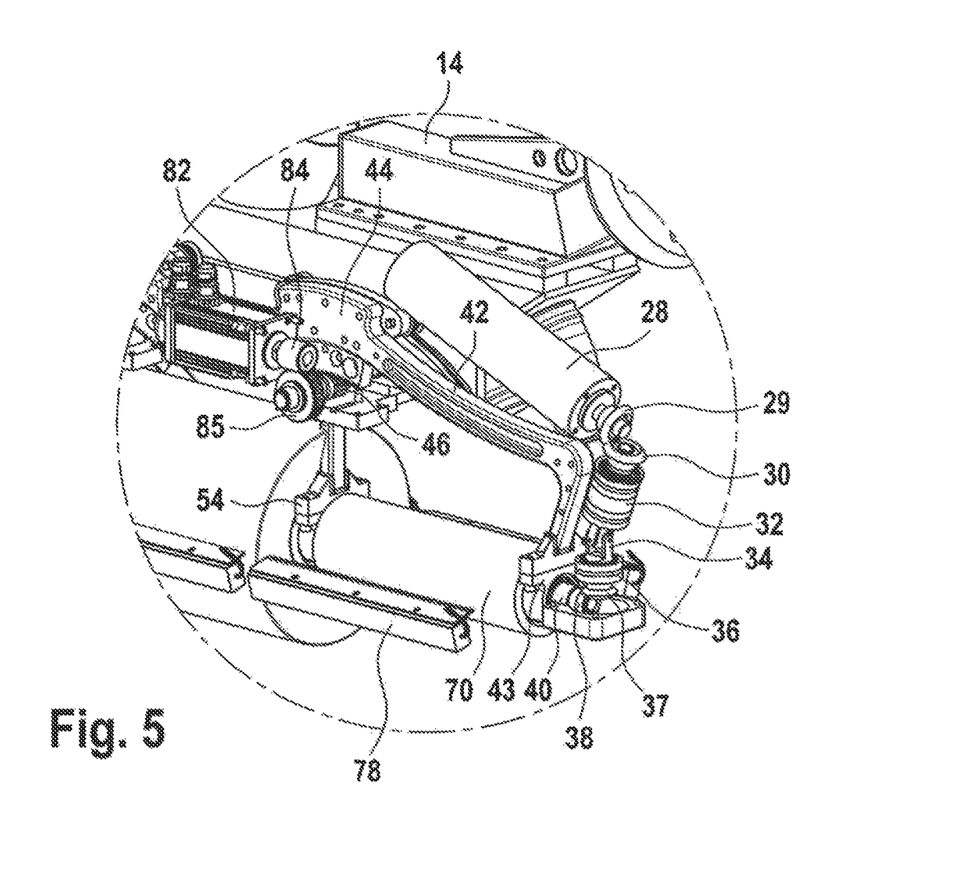
FIG. 5 is an enlarged, perspective representation of the cutout V identified in FIG. 4.

For driving the pinions 46, 52 a drive motor 82, 83 is each provided respectively (see FIG. 4) which is coupled by means of two pinions 84, 85 (see FIG. 5) to the respective pinions 46 or 52, respectively (FIG. 5 only shows the drive motor 82 that is coupled to the pinion 46 by means of the two pinions 84, 85.

Figure 7:
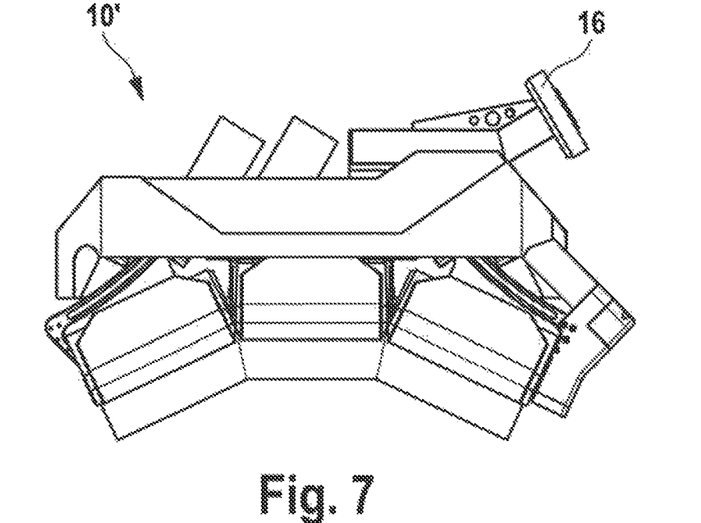
FIG. 7 is a side representation of the device according to FIG. 6, shown in reduced scale.

Such each of the two outer rollers 18, 22 can be adjusted by means of an individual adjusting drive with respect to the central roller 20 independently of the respective other roller 18, 22. There is an adjusting possibility of about +25° (concave position according to FIGS. 6 and 7) and of about −8° to −10° (convex position, not shown).

The pinions 46 and 52, respectively, each are arranged within a common radial plane together with the assigned universal joints 56 and 64, respectively, of the roller 20 in an elongation of the assigned carrier 54 or 66, respectively (see FIG. 5).

As can be seen from FIG. 3, at each roller 18, 20, 22 in the range of the outer end of the assigned cover 19, 21, 23 a ionization rod 80, 81 is respectively arranged that can be powered with a suitable voltage to reach a neutralization of loaded dust particles, so that these do not deposit anymore on the workpiece surface and can be easily sucked off.

In addition adjacent to each ionization rod 80, 81 a doctor blade 88, 89 is arranged. The doctor blades 88, 89 at their edges comprise teeth that rest against the brushes 71 from the outside for stripping off possibly adhering dust particles.

Figure 8:
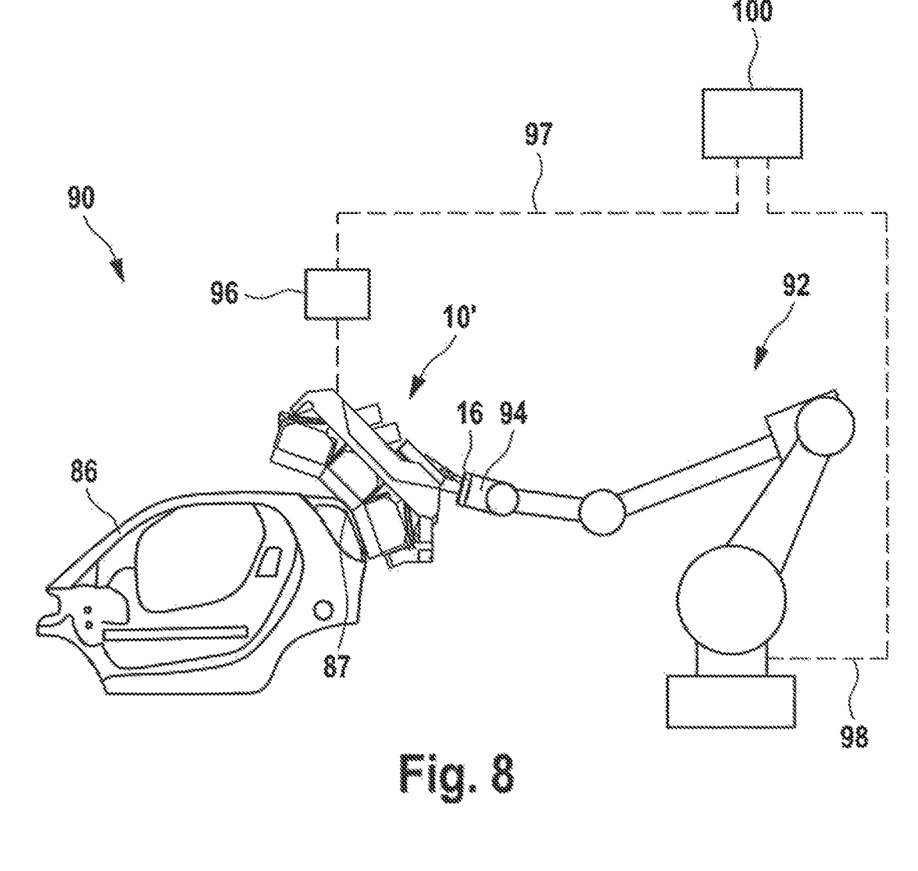
FIG. 8 is a system comprising a handling device configured as a robot, including a device according to FIG. 7 that is received at an end of a robot arm that is pivoted towards a workpiece surface configured as body shell, for cleaning the latter.

FIG. 8 shows the device 10' according to the invention as a part of a system 90 for cleaning of automobile body shells (workpiece 86).

According to FIG. 8 a handling device 92 configured as a robot is provided, at the outer movable arm 94 of which the device 10' is coupled by means of a flange 16. The device 10' comprises a controller depicted with 96. The controller 96 allows to control at least the revolution speed of the drive motor 28, preferably within a range of 0 to 300 1/min, in addition a reversal of the rotation direction, and in addition an individual controlling of the two drives 82, 83 to angularly adjust the outer rollers 18, 22.

In a suitable way the controller of the device 10' is coupled to the controller of the handling device 92 either directly in a suitable way or by means of a higher-ranking central controller 100, as indicated by the lines 97, 98.

Thus the device 10 or 10', respectively, can be moved by the handling device 92 along a workpiece surface 87 and can be controlled in a suitable way to obtain an optimum cleaning effect.

An optimum adaptation to the conditions of a respective workpiece 86 and to the respective cleaning object is made possible by the angular adjustment possibility of the two outer rollers 18, 22 with respect to the central roller 20, by means of the continuous controlling of the revolution speed of the rollers 18, 20, 22, by means of the possible reversal of the rotary direction and by means of the individual control of the angular position of the rollers 18, 20, 22 with respect to each other.

What is claimed is:

1. A device for cleaning or precision machining of workpieces, comprising:
   a housing;
   a first wing and a second wing received adjustably within said housing;
   a first pinion gear received within said housing engaging said first wing allowing to adjust said first wing;
   a second pinion gear received within said housing engaging said second wing allowing to adjust said second wing;
   a central roller having first and second ends being supported by rotary bearings on carriers fixed on said housing;
   a first roller having a first end being connected to said first end of said central roller by a joint and having a second end being supported on said first wing by a rotary bearing;
   a second roller having a first end being connected to said second end of said central roller by a joint and having a second end being supported on said second wing by means of a rotary bearing;
   a drive motor for rotatingly driving said first and second rollers and said central roller for treating a workpiece; and
   a suction device for removing particles from said rollers, wherein said first and second pinion gears are configured to angularly adjust said first and second rollers with respect to said central roller by adjusting said wings.

2. The device of claim 1, further comprising a port provided on said housing for connecting said device with a handling device.

3. The device of claim 1, wherein said first and second rollers and said central roller are at least partially covered by a cover defining a hollow space, and wherein said suction device is coupled to said hollow space.

4. The device of claim 1, wherein each of said rollers comprises a brush being configured for cleaning of workpieces.

5. The device of claim 4, wherein each brush further comprises at least one doctor blade resting against said brush for stripping off adherent particles.

6. The device of claim 1, wherein each of said rollers comprises a central roller body at an outer perimeter of which a brush is secured.

7. The device of claim 1, wherein each of said rollers further comprises a ionization device.

8. The device of claim 1, further comprising an adjusting drive for continuously angularly adjusting said rollers which are arranged side by side.

9. The device of claim 1, wherein said first and second rollers can be adjusted with respect to said central roller convexly to the outside or concavely to the outside.

10. The device of claim 1, wherein one of said rollers at an outer end thereof is coupled to said drive motor by an axial drive fitting and is coupled to said other rollers by universal joints for driving the latter.

11. The device of claim 1, wherein said drive motor is received on one of said wings and is coupled with one of said rollers by at least one intermediate shaft and by a gear drive.

12. The device of claim 1, wherein each pinion gear comprises a bent rack that is driven by a pinion.

13. The device of claim 12, wherein each bent rack is guided movably within a plane through which said rotary bearings also extend by guide rollers that rest against assigned guide rails for guiding the bent rack along its main direction of extension.

14. The device of claim 12, wherein each pinion gear comprises a pinion that is rotatable about an axis that extends through a radial plane of said central roller that also includes two central joints arranged on said central roller.

15. The device of claim 1, wherein each pinion gear is coupled to an adjusting motor.

16. The device of claim 1, wherein said drive motor is configured to rotate said rollers with a speed that can be continuously adjusted in a range of 0 to 400 revolutions per minute (rpm).

17. The device of claim 1, wherein said drive motor is configured to selectively reverse a direction of rotation of said rollers.

18. A device for cleaning or precision machining of workpieces, comprising:
   a housing;
   a central roller having first and second ends being supported by rotary bearings on carriers fixed on said housing;
   a first roller having a first end being connected to said first end of said central roller by a joint and having a second end being supported by a rotary bearing;
   a second roller having a first end being connected to said second end of said central roller by a joint and having a second end being supported by a rotary bearing;
   a drive motor for rotatingly driving said first and second rollers and said central roller for treating a workpiece;
   a suction device for removing particles from said rollers; and
   at least a first and a second pinion gear being coupled to said first and second rollers for angularly adjusting said first and second rollers with respect to said central roller.

19. A system for cleaning or precision machining of workpieces comprising a handling device having a movable arm, whereon there is received:
   a housing;
   a central roller having first and second ends being supported by rotary bearings on carriers fixed on said housing;
   a first roller having a first end being connected to said first end of said central roller by a joint and having a second end being supported by a rotary bearing;
   a second roller having a first end being connected to said second end of said central roller by a joint and having a second end being supported by a rotary bearing;
   a drive motor for rotatingly driving said first and second rollers and said central roller for treating a workpiece;
   a suction device for removing particles from said rollers; and at least a first and a second pinion gear being coupled to said first and second rollers for angularly adjusting said first and second rollers with respect to said central roller.

* * * * *

UNITED STATES PATENT AND TRADEMARK OFFICE
CERTIFICATE OF CORRECTION

PATENT NO. : 11,014,540 B2  
APPLICATION NO. : 16/008512  
DATED : May 25, 2021  
INVENTOR(S) : Butz et al.

Page 1 of 1

It is certified that error appears in the above-identified patent and that said Letters Patent is hereby corrected as shown below:

In the Claims

In Claim 1:
Column 7, Line 39: delete "means of a rotary" and insert --a rotary--

Signed and Sealed this
Twenty-sixth Day of October, 2021

Drew Hirshfeld
*Performing the Functions and Duties of the*
*Under Secretary of Commerce for Intellectual Property and*
*Director of the United States Patent and Trademark Office*